(12) United States Patent  
Sedayao et al.

(10) Patent No.: US 9,304,956 B2
(45) Date of Patent: Apr. 5, 2016

(54) INTERRUPT BLOCKER

(71) Applicant: Intel Corporation, Santa Clara, CA (US)

(72) Inventors: Jeffrey C. Sedayao, San Jose, CA (US); Vishwa Hassan, Chandler, AZ (US); Douglas P. Devetter, Cameron Park, CA (US); Terry H. Yoshi, Folsom, CA (US); David W. Stone, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 284 days.

(21) Appl. No.: 14/043,409

(22) Filed: Oct. 1, 2013

(65) Prior Publication Data

US 2014/0108689 A1 Apr. 17, 2014

Related U.S. Application Data

(63) Continuation of application No. 12/827,554, filed on Jun. 30, 2010, now Pat. No. 8,549,201.

(51) Int. Cl.
*H04M 3/42* (2006.01)
*G06F 13/24* (2006.01)
*H04M 3/436* (2006.01)

(52) U.S. Cl.
CPC .............. *G06F 13/24* (2013.01); *H04M 3/436* (2013.01)

(58) Field of Classification Search
CPC ....................................................... H04M 3/436
USPC ..................................... 379/210.02; 455/417
See application file for complete search history.

(56) References Cited

U.S. PATENT DOCUMENTS

| | | | |
|---|---|---|---|
| 4,426,679 A | 1/1984 | Yu et al. | |
| 4,967,345 A | 10/1990 | Clarke et al. | |
| 5,619,657 A | 4/1997 | Sudama et al. | |
| 5,715,393 A | 2/1998 | Naugle | |
| 5,787,253 A | 7/1998 | McCreery et al. | |
| 5,793,976 A | 8/1998 | Chen et al. | |
| 5,812,780 A | 9/1998 | Chen et al. | |
| 5,867,659 A | 2/1999 | Otteson et al. | |
| 5,892,917 A | 4/1999 | Myerson | |
| 5,913,041 A | 6/1999 | Ramanathan et al. | |
| 5,946,679 A | 8/1999 | Ahuja et al. | |
| 5,949,974 A * | 9/1999 | Ewing | G06F 1/26 709/202 |
| 5,968,125 A | 10/1999 | Garrick et al. | |
| 5,983,270 A | 11/1999 | Abraham et al. | |
| 5,983,275 A | 11/1999 | Ecclesine | |
| 6,055,572 A | 4/2000 | Saksena | |
| 6,085,226 A | 7/2000 | Horvitz | |
| 6,108,800 A | 8/2000 | Asawa | |

(Continued)

OTHER PUBLICATIONS

Office Action received for U.S. Appl. No. 11/951,871 mailed on Apr. 20, 2010, 6 pages.

(Continued)

*Primary Examiner* — Paul R Myers
(74) *Attorney, Agent, or Firm* — Alpine Technology Law Group LLC

(57) ABSTRACT

A method comprises maintaining, in a first electronic device, a list of one or more electronic devices associated with a user, receiving, in the first electronic device, a first command, in response to the first command, forwarding a command to block interrupts on one or more electronic devices on the list of electronic devices. Other embodiments may be described.

18 Claims, 5 Drawing Sheets

(56) References Cited

U.S. PATENT DOCUMENTS

| | | | |
|---|---|---|---|
| 6,112,238 A | 8/2000 | Boyd et al. | |
| 6,148,335 A | 11/2000 | Haggard et al. | |
| 6,167,431 A | 12/2000 | Gillies et al. | |
| 6,173,418 B1 | 1/2001 | Fujino et al. | |
| 6,230,204 B1 | 5/2001 | Fleming, III | |
| 6,263,396 B1 | 7/2001 | Cottle et al. | |
| 6,317,786 B1 | 11/2001 | Yamane et al. | |
| 6,317,787 B1 | 11/2001 | Boyd et al. | |
| 6,435,416 B1 | 8/2002 | Slassi | |
| 6,438,537 B1 | 8/2002 | Netz et al. | |
| 6,470,388 B1 | 10/2002 | Niemi et al. | |
| 6,477,523 B1 | 11/2002 | Chiang | |
| 6,490,617 B1 | 12/2002 | Hemphill et al. | |
| 6,490,620 B1 | 12/2002 | Ditmer et al. | |
| 6,505,245 B1 | 1/2003 | North et al. | |
| 6,560,648 B1 | 5/2003 | Dunn et al. | |
| 6,570,867 B1 | 5/2003 | Robinson et al. | |
| 6,574,693 B1 | 6/2003 | Alasti et al. | |
| 6,598,078 B1 | 7/2003 | Ehrlich et al. | |
| 6,621,798 B1 | 9/2003 | Krishnan et al. | |
| 6,662,230 B1 | 12/2003 | Eichstaedt et al. | |
| 6,681,116 B1 | 1/2004 | Johnson | |
| 6,789,115 B1 | 9/2004 | Singer et al. | |
| 7,120,717 B2 | 10/2006 | Vu | |
| 7,130,948 B2 | 10/2006 | Bian et al. | |
| 7,140,025 B1 | 11/2006 | Dillow et al. | |
| 7,143,443 B2 | 11/2006 | Song et al. | |
| 7,284,046 B1 * | 10/2007 | Kreiner | H04L 67/303 455/414.1 |
| 7,477,748 B2 | 1/2009 | Schmidt | |
| 7,523,190 B1 | 4/2009 | Bickerstaff et al. | |
| 7,657,946 B2 | 2/2010 | Yan | |
| 7,761,531 B2 | 7/2010 | Johnson et al. | |
| 7,934,036 B2 | 4/2011 | Conti et al. | |
| 7,937,759 B2 | 5/2011 | Wu et al. | |
| 7,941,534 B2 | 5/2011 | de La Huerga | |
| 7,986,938 B1 * | 7/2011 | Meenan | H04L 63/08 455/410 |
| 8,750,482 B2 * | 6/2014 | Chingon | H04M 1/573 379/142.04 |
| 2002/0085701 A1 * | 7/2002 | Parsons | H04M 3/54 379/211.01 |
| 2002/0094799 A1 | 7/2002 | Elliott et al. | |
| 2003/0078080 A1 * | 4/2003 | Miriyala | H04M 1/72577 455/567 |
| 2003/0206619 A1 * | 11/2003 | Curbow | H04M 3/42195 379/210.01 |
| 2004/0072580 A1 | 4/2004 | Honda et al. | |
| 2004/0081105 A1 | 4/2004 | Shimazaki et al. | |
| 2004/0223599 A1 * | 11/2004 | Bear | H04M 3/436 379/207.02 |
| 2005/0215287 A1 | 9/2005 | Efland et al. | |
| 2006/0155806 A1 | 7/2006 | Du et al. | |
| 2006/0173951 A1 | 8/2006 | Arteaga et al. | |
| 2006/0224742 A1 | 10/2006 | Shahbazi | |
| 2006/0236408 A1 | 10/2006 | Yan | |
| 2007/0055804 A1 | 3/2007 | Hay | |
| 2008/0027643 A1 * | 1/2008 | Basir | G01C 21/362 701/469 |
| 2008/0039055 A1 | 2/2008 | Hannikainen et al. | |
| 2008/0077767 A1 | 3/2008 | Khosravi et al. | |
| 2008/0162625 A1 | 7/2008 | Sedayao et al. | |
| 2008/0281971 A1 * | 11/2008 | Leppanen | H04L 12/1818 709/228 |
| 2009/0094370 A1 | 4/2009 | Jacob et al. | |
| 2009/0150568 A1 | 6/2009 | Vicente et al. | |
| 2009/0172817 A1 | 7/2009 | Sedayao | |
| 2009/0222450 A1 | 9/2009 | Zigelman | |
| 2009/0234906 A1 | 9/2009 | Chai et al. | |
| 2009/0279683 A1 * | 11/2009 | Gisby | H04M 3/42263 379/201.02 |
| 2010/0077471 A1 * | 3/2010 | Schleiss | G05B 19/0428 726/13 |
| 2010/0210240 A1 | 8/2010 | Mahaffey et al. | |
| 2011/0107436 A1 | 5/2011 | Cholas et al. | |
| 2012/0069131 A1 | 3/2012 | Abelow | |
| 2012/0174212 A1 | 7/2012 | Dart et al. | |

OTHER PUBLICATIONS

Office Action received for U.S. Appl. No. 11/951,871 mailed on Oct. 15, 2009, 12 pages.

Office Action received for U.S. Appl. No. 11/618, 228 mailed on Jun. 4, 2010, 12 pages.

Sedayao, Jeff "Intel IT Overlay", PlanetLab Workshop at HPLABS, May 11, 2006, 7 pages.

Office Action Received for U.S. Appl. No. 09/471,964, mailed on Dec. 27, 2002, 12 pages.

Office Action Received for U.S. Appl. No. 09/471,964, mailed on Oct. 23, 2003, 14 pages.

Office Action Received for U.S. Appl. No. 09/471,964, mailed on Mar. 10, 2005, 15 pages.

Office Action Received for U.S. Appl. No. 09/471,964, mailed on Dec. 2, 2005, 16 pages.

Office Action Received for U.S. Appl. No. 09/471,964, mailed on Jun. 15, 2006, 17 pages.

Office Action Received for U.S. Appl. No. 09/471,964, mailed on May 17, 2007, 16 pages.

Office Action Received for U.S. Appl. No. 09/471,964, mailed on Jun. 24, 2008, 18 pages.

Office Action Received for U.S. Appl. No. 09/471,964, mailed on Jul. 15, 2005, 15 pages.

Office Action Received for U.S. Appl. No. 09/471,964, mailed on Dec. 7, 2006, 17 pages.

Netlingo "Defination of Filter", Retrieved on Jul. 15, 2010, Webpage Available at http://www.netlingo.com/word/filter.php.

Office Action Received for U.S. Appl. No. 09/471,964, mailed on Feb. 6, 2008, 18 pages.

Notice of Allowance Received for U.S. Appl. No. 09/471,964, mailed on Mar. 3, 2004, 6 pages.

Notice of Allowance Received for U.S. Appl. No. 09/471,964, mailed on Dec. 10, 2008, 10 pages.

\* cited by examiner

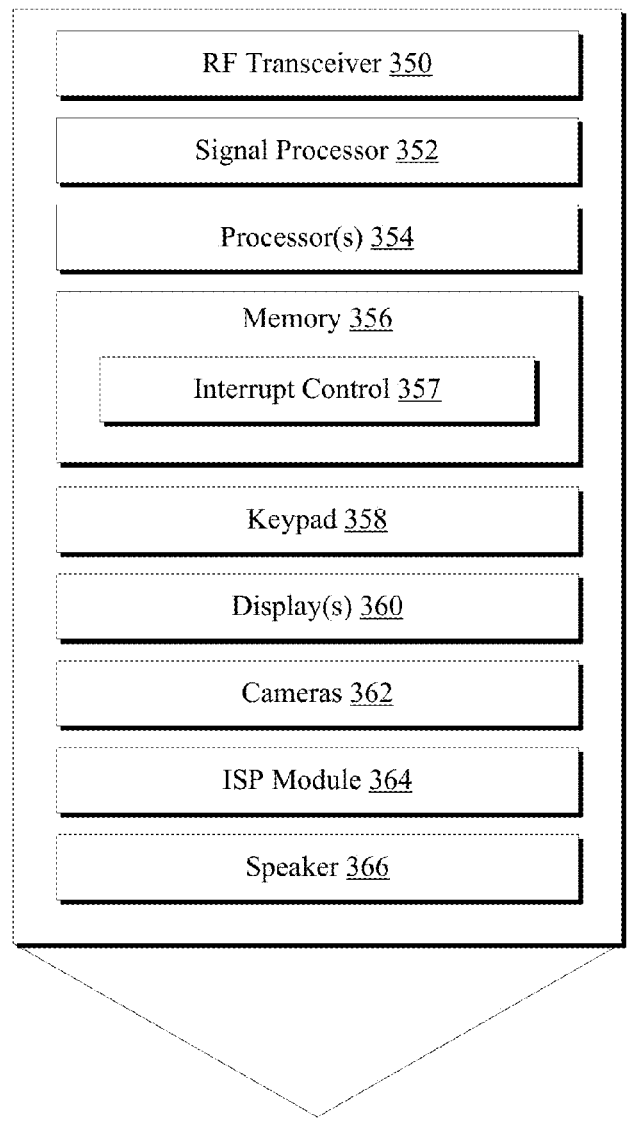
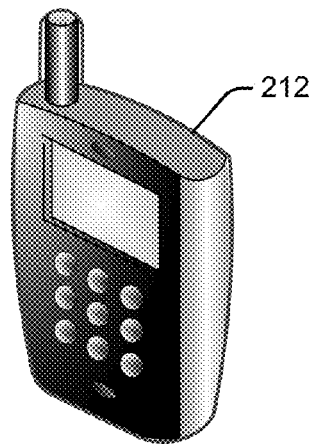
FIG. 3

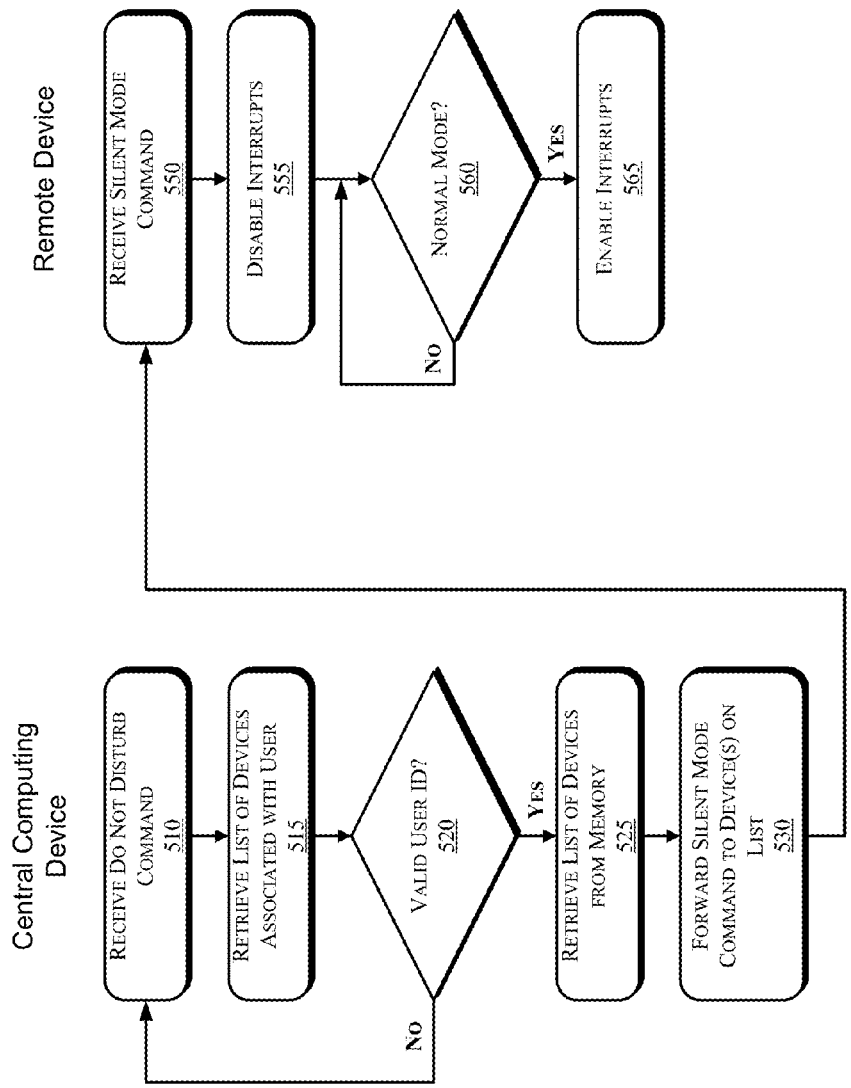

INTERRUPT BLOCKER

RELATED APPLICATIONS

This application is a continuation of U.S. patent application Ser. No. 12/827,554 filed Jun. 30, 2010, entitled "Interrupt Blocker", now U.S. Pat. No. 8,549,201 issued Oct. 1, 2013.

BACKGROUND

The subject matter described herein relates generally to the field of electronic devices and more particularly to a system and method to block interrupts on one or more electronic devices.

Some electronic devices, or software executing thereon, generate interrupts or notices in response to certain conditions. By way of example, electronic devices such as mobile phones generate an interrupt in response to an incoming call, electronic mail message, or text message. Similarly, personal computers may generate an interrupt in response to an incoming electronic mail message, instant message, or in response to an event on a calendar program. In some contexts these interrupts may be a distraction. Accordingly techniques to block interrupts may find utility.

BRIEF DESCRIPTION OF THE DRAWINGS

The detailed description is described with reference to the accompanying figures.

FIG. 3 is a schematic illustration of a remote device adapted to to block interrupts in accordance with some embodiments.

FIG. 4 is a flowchart illustrating operations in part of a method to block interrupts, according to embodiments.

FIG. 5 is a flowchart illustrating operations in part of a method to block interrupts, according to embodiments.

DETAILED DESCRIPTION

Described herein are exemplary systems and methods to block interrupts in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
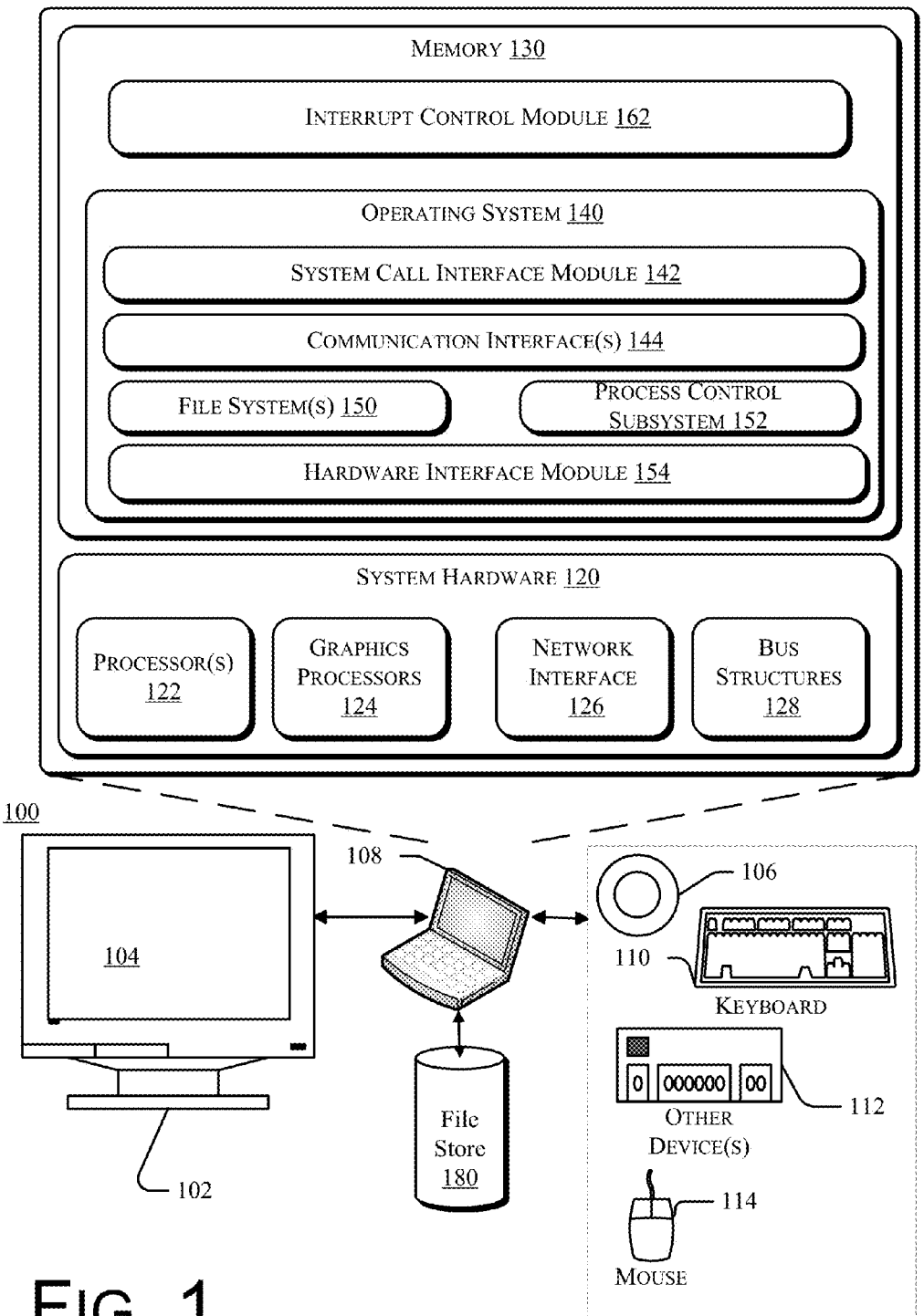
FIG. 1 is a schematic illustration of an exemplary computing device which may be used to block interrupts in accordance with some embodiments.

FIG. 1 is a schematic illustration of an exemplary computing device which may be used to block interrupts in accordance with some embodiments. In one embodiment, system 100 includes an electronic device 108 and one or more accompanying input/output devices including a display 102 having a screen 104, one or more speakers 106, a keyboard 110, one or more other I/O device(s) 112, and a mouse 114. The other I/O device(s) 112 may include a touch screen, a voice-activated input device, a track ball, and any other device that allows the system 100 to receive input from a user.

In various embodiments, the electronic device 108 may be embodied as a personal computer, a laptop computer, a personal digital assistant, a mobile telephone, an entertainment device, or another computing device. The electronic device 108 includes system hardware 120 and memory 130, which may be implemented as random access memory and/or read-only memory. A file store 180 may be communicatively coupled to computing device 108. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network.

System hardware 120 may include one or more processors 122, one or more graphics processors 124, network interfaces 126, and bus structures 128. In one embodiment, processor 122 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of computing system 100 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11 compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 130 may include an operating system 140 for managing operations of computing device 108. In one embodiment, operating system 140 includes a hardware interface module 154 that provides an interface to system hardware 120. In addition, operating system 140 may include a file system 150 that manages files used in the operation of computing device 108 and a process control subsystem 152 that manages processes executing on computing device 108.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

In one embodiment, memory 130 includes an interrupt control module 162 which cooperates with one or more remote devices to block interrupts on the one or more remote devices. In one embodiment, the interrupt control module 162 may be may be embodied as logic instructions stored in the computer readable memory module 130 of the system 100. In various embodiments the interrupt control module 162 may be reduced to firmware which may be stored with a basic input/output system (BIOS) for the system 100, or to hard-wired logic circuitry, e.g., an integrated circuit (IC). Additional details about the operations implemented by interrupt control module 162 are described below.

Figure 2:
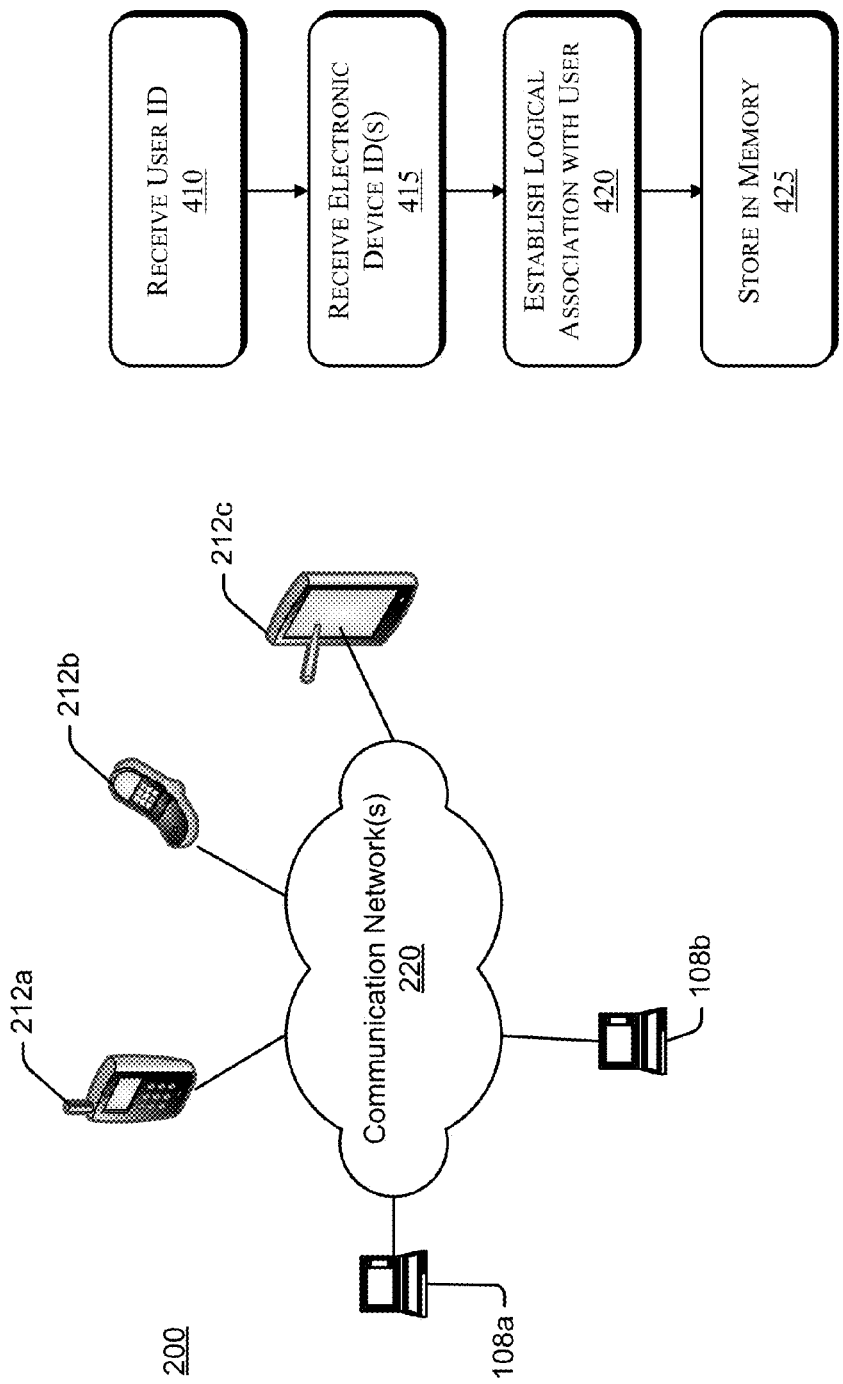
FIG. 2 is a schematic illustration of an exemplary networking environment in which a computing device may block interrupts in one or more remote devices in accordance with some embodiments.

FIG. 2 is a schematic illustration of an exemplary networking environment in which a computing device may block interrupts in one or more remote devices in accordance with some embodiments. Networking environment 200 may comprise a one or more computing devices 108a, 108b (referred to generally by 108) connected to one or more remote electronic devices 212a, 212b, 212c (referred to generally by 212) by a one or more communication networks 220

Computing devices 108 may be implemented as, e.g., a networked computer, a laptop computer, a desktop computer, an electronic device as described with reference to the computing device 108 in FIG. 1. The communication network(s) 220 may be implemented as a Personal Area Network (PAN), Local Area Network (LAN), Metropolitan Area Network (MAN) or a Wide Area Network (WAN) or the like. Furthermore, communication network 220 may comprise one or more sub-networks. By way of example, and not by limitation, communication network 220 may comprise one or more wireless access points (WAPs) that establish a wireless network, which is coupled to a LAN or directly to a backbone network such as the Internet. Additionally, the communication network 220 may include a variety of input/output transports such as, but not limited to; wired USB or serial links, Wireless 802.11x link, wireless USB, Blue-tooth, infra red link or the like.

One or more of the electronic devices 212 may include a mobile communication/computing device such as a smart phone 212a, a pager, 212b, or a tablet computing device 212c. FIG. 3 is a schematic illustration of an electronic device 212 according to some embodiments. Referring to FIG. 3, in some embodiments electronic device 212 may be embodied as a mobile telephone, a personal digital assistant (PDA), a laptop computer, or the like. Electronic device 212 may include an RF transceiver 350 to transceive RF signals and a signal processing module 352 to process signals received by RF transceiver 350.

RF transceiver 350 may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Remote device 212 may further include one or more processors 354 and a memory module 356. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, processor 354 may be one or more processors in the family of Intel® PXA27x processors available from Intel® Corporation of Santa Clara, Calif. Alternatively, other CPUs may be used, such as Intel's Itanium®, XEON™, ATOM™, and Celeron® processors. Also, one or more processors from other manufactures may be utilized. Moreover, the processors may have a single or multi core design. In some embodiments, memory module 356 includes random access memory (RAM); however, memory module 356 may be implemented using other memory types such as dynamic RAM (DRAM), synchronous DRAM (SDRAM), and the like.

Electronic device 212 may further include one or more input/output interfaces such as, e.g., a keypad 358 and one or more displays 360, and one or more speakers 366. In some embodiments electronic device 212 comprises one or more camera modules 362 and an image signal processor 364.

In some embodiments electronic device 212 may include an interrupt control module 357. Interrupt control module 357 cooperates with the interrupt control module 162 in computing device 108 to block interrupts on electronic device in a programmatic fashion. By way of example, in some embodiments a list of electronic devices associated with a user may be stored in the memory of computing device 108. The list may include the computing device 108 and one or more electronic devices 212. A do not disturb command may be entered in the computing device, which triggers the computing device 108 to send a silent mode command to one or more electronic devices 212 associated with the user. The electronic device(s) 212 may block interrupts generated by the operation of the device(s) 212.

Operations for blocking interrupts are described with reference to FIG. 4 and FIG. 5. In some embodiments the operations of FIG. 4 may be implemented by the interrupt control module 162 on computing device 108. The operations of FIG. 5 may be implemented by the interrupt control module 162 on computing device 108 and the interrupt control module 357 on the electronic device(s) 212.

Referring first to FIG. 4, in some embodiments a user identifier (ID) may be associated with one or more computing devices 108 and one or more electronic devices 212. Thus, at operation 410 a user ID is received, and at operation 415 one or more electronic device IDs are received. In some embodiments a user may enter a user ID and device IDs into the computing device 108 via a keyboard 110 or another input/output device.

At operation 420 a logical relationship is established between the user ID and the one or more electronic device IDs. By way of example, the user ID and the device ID may be stored in record. At operation 425 the record is stored in a memory module 130 coupled to computing device 108, e.g., the memory module 130 or the file store 180.

In some embodiments the computing device 108 may maintain additional information associated with the electronic device(s) 212 associated with a user. By way of example, the computing device 108 may maintain a network address and an operational status for one or more electronic devices 212. In another embodiment the computing device 108 may maintain location information associated with the electronic device(s) 212 associated with a user.

Referring now to FIG. 5, at operation 510 a do not disturb command may be entered in the computing device 108. By way of example a use may enter a do not disturb command directly into computing device 108 via a keyboard or other input/output device. Alternatively, a user may enter a do not disturb command via a remote device, including one or more of the electronic devices 212 coupled to computing device 108. Alternatively, a do not disturb command may be entered by a software module executing on computing device 108 or a remote device. By way of example, a calendar program may be configured to schedule a do not disturb command for a particular time and day. In some embodiments the do not disturb command includes a user ID.

If, at operation 515, the user ID is not valid, then control passes back to operation 510 and a new ID may be entered. By contrast, if at operation 515 the user ID is valid, then control passes to operation 520 and the record associated with the user ID is retrieved from memory 130 or file store 180 (operation 525). At operation 530 a silent mode command is forwarded to one or more devices on the list of electronic devices 212 associated with the user ID. In some embodiments all electronic devices 212 associated with the user ID may be notified, while in other embodiments only a subset of devices may be notified.

At operation 550 the silent mode command is received in the one or more electronic device(s) 212 associated with the user ID. At operation 555 the interrupt control module 357 on the electronic device(s) 212 disables interrupts on the device(s) 212. By way of example, in some embodiments the interrupt control module 357 may override the operations of one or more applications executing on the device(s) 212 to block any alerts issued by the application(s). In other embodiments the interrupt control module 357 may operate at the hardware level, e.g., by blocking the output of a speaker on the electronic device(s) 212.

At operation 560 it is determined whether the device(s) 212 should be restored to a normal operating mode. By way of example, the interrupt control module 357 may return the electronic device 212 to a normal operating mode in response to a normal mode command from the computing device 108, or after a predetermined amount of time has elapsed. If, at operation 560 no events have occurred to return the electronic device(s) back to a normal operating mode, then the electronic device(s) 212 continue operating in silent mode and wait for an event to return to normal operating mode. By contrast, if at operation 560 an event has occurred to return the electronic device(s) 212 then control passes to operation 565 and the electronic device(s) are returned to normal operating mode in which interrupts are allowed.

Figure 6:
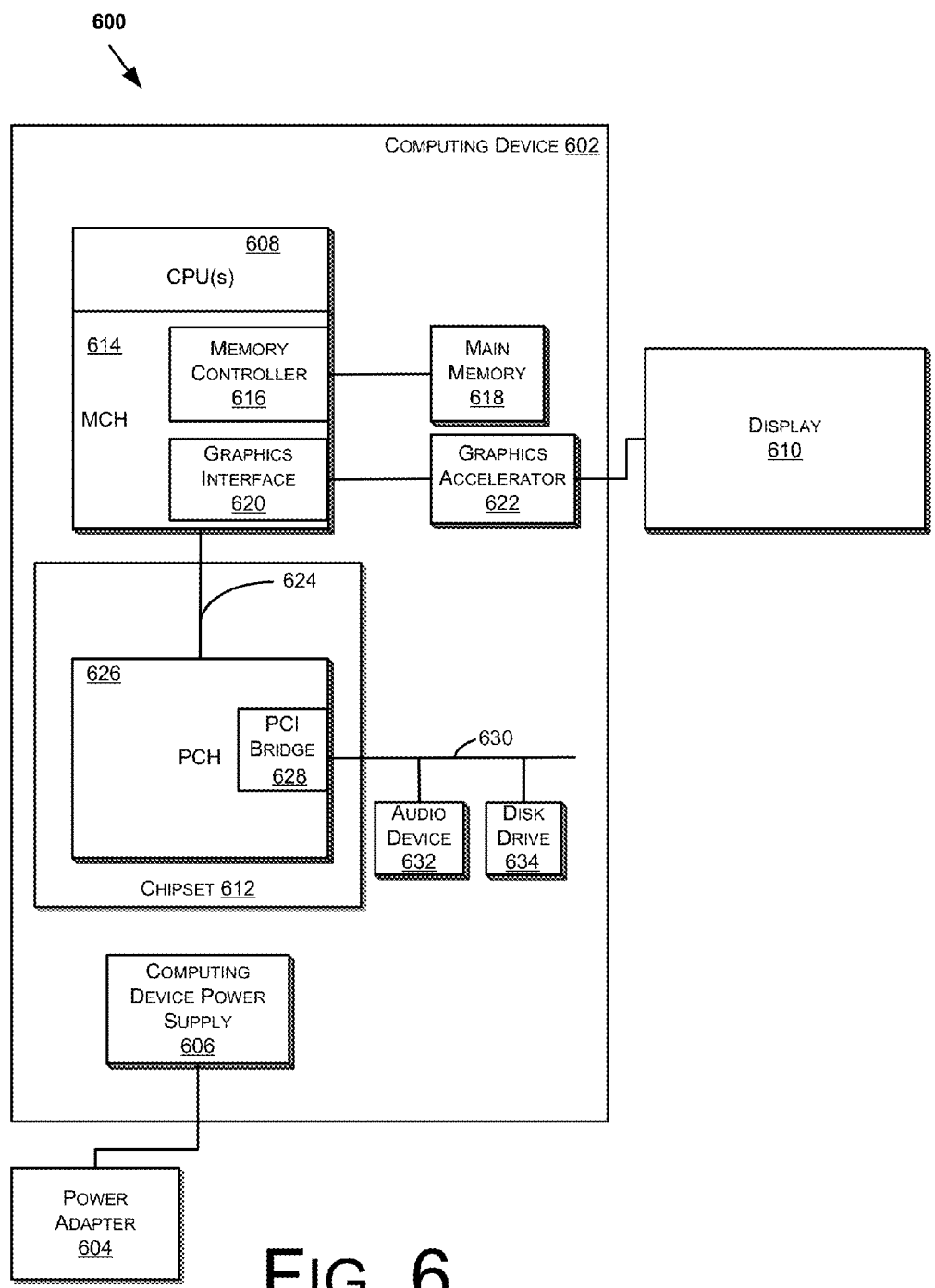
FIG. 6 is a schematic illustration of an electronic device which may be adapted to be locked, according to an embodiment.

As described above, in some embodiments the electronic device 108 may be embodied as a computer system. FIG. 6 is a schematic illustration of a computer system 600 in accordance with some embodiments. The computer system 600 includes a computing device 602 and a power adapter 604 (e.g., to supply electrical power to the computing device 602). The computing device 602 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 602 (e.g., through a computing device power supply 606) from one or more of the following sources: one or more battery packs, an alternating current (AC) outlet (e.g., through a transformer and/or adaptor such as a power adapter 604), automotive power supplies, airplane power supplies, and the like. In some embodiments, the power adapter 604 may transform the power supply source output (e.g., the AC outlet voltage of about 110VAC to 240VAC) to a direct current (DC) voltage ranging between about 5VDC to 12.6VDC. Accordingly, the power adapter 604 may be an AC/DC adapter.

The computing device 602 may also include one or more central processing unit(s) (CPUs) 608. In some embodiments, the CPU 608 may be one or more processors in the Pentium® family of processors including the Pentium® II processor family, Pentium® III processors, Pentium® IV, or CORE2 Duo processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 612 may be coupled to, or integrated with, CPU 608. The chipset 612 may include a memory control hub (MCH) 614. The MCH 614 may include a memory controller 616 that is coupled to a main system memory 618. The main system memory 618 stores data and sequences of instructions that are executed by the CPU 608, or any other device included in the system 600. In some embodiments, the main system memory 618 includes random access memory (RAM); however, the main system memory 618 may be implemented using other memory types such as dynamic RAM (DRAM), synchronous DRAM (SDRAM), and the like. Additional devices may also be coupled to the bus 610, such as multiple CPUs and/or multiple system memories.

The MCH 614 may also include a graphics interface 620 coupled to a graphics accelerator 622. In some embodiments, the graphics interface 620 is coupled to the graphics accelerator 622 via an accelerated graphics port (AGP). In some embodiments, a display (such as a flat panel display) 640 may be coupled to the graphics interface 620 through, for example, a signal converter that translates a digital representation of an image stored in a storage device such as video memory or system memory into display signals that are interpreted and displayed by the display. The display 640 signals produced by the display device may pass through various control devices before being interpreted by and subsequently displayed on the display.

A hub interface 624 couples the MCH 614 to an platform control hub (PCH) 626. The PCH 626 provides an interface to input/output (I/O) devices coupled to the computer system 600. The PCH 626 may be coupled to a peripheral component interconnect (PCI) bus. Hence, the PCH 626 includes a PCI bridge 628 that provides an interface to a PCI bus 630. The PCI bridge 628 provides a data path between the CPU 608 and peripheral devices. Additionally, other types of I/O interconnect topologies may be utilized such as the PCI Express™ architecture, available through Intel® Corporation of Santa Clara, Calif.

The PCI bus 630 may be coupled to an audio device 632 and one or more disk drive(s) 634. Other devices may be coupled to the PCI bus 630. In addition, the CPU 608 and the MCH 614 may be combined to form a single chip. Furthermore, the graphics accelerator 622 may be included within the MCH 614 in other embodiments.

Additionally, other peripherals coupled to the PCH 626 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 602 may include volatile and/or nonvolatile memory.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
   logic to:
   associate a plurality of communication devices with a user;
   determine the user has a do not disturb status at a first time; and
   forward a silent mode command to at least one communication device of the plurality of communication devices associated with the user, wherein the silent mode command causes the at least one communication device to block incoming alerts generated by one or more applications executing on the at least one communication device.

2. The apparatus of claim 1, comprising logic to:
   determine the user does not have the do not disturb status at a second time; and
   allow incoming communications from one or more of the plurality of communication devices at the second time in response to the lack of the do not disturb status.

3. The apparatus of claim 1, wherein the silent mode command causes the at least one communication device to block an output of a speaker on the at least one communication device.

4. The apparatus of claim 1, wherein the incoming communications comprises one or more of an email, a text message, and a phone call.

5. The apparatus of claim 1, wherein the do not disturb status determination comprises referencing calendar data associated with the user.

6. The apparatus of claim 1, wherein the do not disturb status determination comprises receiving a do not disturb status from the user.

7. A non-transitory machine-readable medium to store instructions, the instructions, when read by a machine, to cause the machine to:
   associate a plurality of communication devices with a user;
   determine the user has a do not disturb status at a first time; and
   forward a silent mode command to at least one communication device of the plurality of communication devices associated with the user, wherein the silent mode command causes the at least one communication device to block incoming alerts generated by one or more applications executing on the at least one communication device.

8. The non-transitory machine-readable medium of claim 7, wherein the non-transitory machine readable medium comprises instructions to further cause the machine to:
   determine the user does not have the do not disturb status at a second time;
   and
   allow incoming communications from one or more of the plurality of communication devices at the second time in response to the lack of the do not disturb status.

9. The non-transitory machine-readable medium of claim 7, wherein the silent mode command causes the at least one communication device to block an output of a speaker on the at least one communication device.

10. The non-transitory machine-readable medium of claim 7, wherein the incoming communications comprises one or more of an email, a text message, and a phone call.

11. The non-transitory machine-readable medium of claim 7, wherein the do not disturb status determination comprises referencing calendar data associated with the user.

12. The non-transitory machine-readable medium of claim 7, wherein the do not disturb status determination comprises receiving a do not disturb status from the user.

13. An electronic device, comprising:
   at least one processor; and
   logic to:
      associate a plurality of communication devices with a user;
      determine the user has a do not disturb status at a first time; and
      forward a silent mode command to at least one communication device of the plurality of communication devices associated with the user, wherein the silent mode command causes the at least one communication device to block incoming alerts generated by one or more applications executing on the at least one communication device.

14. The electronic device of claim 13, comprising logic to:
   determine the user does not have the do not disturb status at a second time; and
   allow incoming communications from one or more of the plurality of communication devices at the second time in response to the lack of the do not disturb status.

15. The electronic device of claim 13, wherein the silent mode command causes the at least one communication device to block an output of a speaker on the at least one communication device.

16. The electronic device of claim 13, wherein the incoming communications comprises one or more of an email, a text message, and a phone call.

17. The electronic device of claim 13, wherein the do not disturb status determination comprises referencing calendar data associated with the user.

18. The electronic device of claim 13, wherein the do not disturb status determination comprises receiving a do not disturb status from the user.

* * * * *